United States Patent Office 3,000,918
Patented Sept. 19, 1961

3,000,918
VINYL ESTER SYNTHESIS
Elmar K. Wilip, Cambridge, David Rubinstein, Brookline, John L. Ohlson, Bedford, and Charles A. Carey, Cambridge, Mass., assignors to W. R. Grace & Co., Cambridge, Mass., a corporation of Connecticut
No Drawing. Filed May 15, 1958, Ser. No. 735,378
9 Claims. (Cl. 260—410.9)

This invention relates to vinyl esters and to an improved process for their preparation.

Vinyl esters, such as vinyl stearate, the vinyl esters of tall oil fatty acids, vinyl benzoate and others, are valuable to the plastics industry in the manufacture of polymers and copolymers for widely varying uses. Polymers or copolymers of vinyl esters may be used, for example, in molding compositions, as adhesives, as coating materials, or as polymerizing plasticizers in resin compositions such as plastisols.

Certain vinyl esters have in the past been manufactured by the action of acetylene on carboxylic acids. Because this process requires the use of high pressure equipment and special technology, there has been a need for an alternative process which can be carried out with less expensive and less specialized equipment.

A possibility for such an alternative process is the so-called "vinyl interchange" reaction, in which vinyl esters may be prepared by reacting vinyl acetate with the desired carboxylic acids in readily available equipment and at normal atmospheric pressures. However, for several reasons which will be discussed below, the vinyl interchange reaction has not heretofore proved to be of practical or commercial importance.

The vinyl interchange reaction is represented by the following equation:

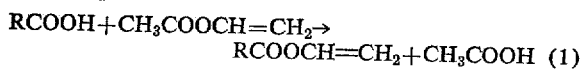

The reaction is carried out in the presence of a catalyst, usually mercuric sulfate formed in situ by the addition to the reaction mixture of mercuric acetate and sulfuric acid. Mercury salts of strong acids, as well as zinc and cadmium salts may also be used as catalysts.

In the past, the reaction has been carried out at refluxing temperature in about 3 hours, or, after an initial period of 15 minutes at 75° C., it has been allowed to proceed at room temperature, in which case about 4 days' time is necessary for the reaction to reach the desired degree of completion. The milder reaction conditions are preferable in order to minimize side reactions and polymerization. An excess of vinyl acetate over the organic acid is desirable, the proportion ordinarily employed being 6 moles of vinyl acetate to 1 mole of acid. The amount of mercuric acetate ordinarily added to the reaction mixture is 2% of the weight of the organic acid. After the reaction has reached equilibrium the sulfuric acid is neutralized by the addition of sodium acetate, and vinyl acetate and acetic acid are removed by distillation. The vinyl ester is then isolated by distillation.

The above-described process is not a practical nor an economic method for the commercial production of vinyl esters because of inherent process difficulties, low yields and the loss of raw materials due to side reactions which take place during the course of the reaction and during purification of the products. As a result, the process has been, in fact, suitable only for the laboratory preparation of vinyl esters.

The yield of vinyl ester obtained by the vinyl interchange reaction is dependent on two factors—first, the extent to which the organic acid is converted to its vinyl ester in the course of the reaction, and second, the amount of the ester lost in various ways during the process of its production and isolation. The first factor, i.e, the proportion of carboxylic acid converted to vinyl ester is hereinafter referred to as the "percent conversion" of the organic acid. It may be determined by analysis of a small sample of the reaction mixture after equilibrium has been reached.

The term "yield of vinyl ester" as used herein indicates actual amount of ester recovered in pure form at the completion of the process. Yield is also expressed as a percentage of the theoretical yield which would be obtained if 100% of the carboxylic acid were converted to its corresponding vinyl ester and if no losses of the ester took place during the process. It is obvious that in order to obtain high final yields of a vinyl ester, the percentage conversion of the carboxylic acid must be high and losses of the ester during the process must be kept to a minimum.

One of the drawbacks of the vinyl interchange process as carried out in the past has been the low proportion of carboxylic acid which has been converted to vinyl ester. Not only does this low conversion of carboxylic acid necessarily result in a low final yield of ester, but it also creates serious process difficulties because the separation of large quantities of unreacted organic acid from the vinyl ester product is such a difficult and involved procedure. This factor alone has been sufficient to prevent the vinyl interchange process from attaining any commercial importance.

Another factor which has prevented practical use of the vinyl interchange reaction for the production of vinyl esters has been the heavy loss of esters prepared by this process during the final distillation step. As pointed out above, following the vinyl interchange reaction, excess vinyl acetate and acetic acid were first removed by distillation. The remaining mixture of vinyl ester product and unreacted carboxylic acid was then distilled and the pure vinyl ester was recovered. Since mixtures of vinyl esters with their corresponding unreacted organic acids undergo partial decomposition when distilled in the presence of mercury salts, high losses of vinyl ester product with attendant losses of the organic acid were an inevitable result of the above method of separation. Furthermore, unless proper conditions are maintained, there may be a considerable loss of ester due to polymerization especially in the case of the higher boiling esters.

A further factor which has made the vinyl interchange process impractical and uneconomic has been the side reactions which take place concurrently with the main reaction and during purification of the product. The most important side reaction is the formation of ethylidene diesters, represented by the following equation:

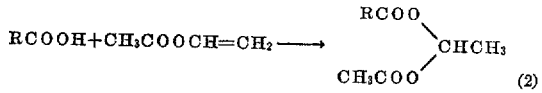

In this equation, the acid which reacts with vinyl acetate to form the ethylidene diester may be either the carboxylic acid which is to be vinylated, represented by RCOOH, or the acetic acid formed by the vinyl interchange reaction shown in Equation 1 or a mixture of the two. It is apparent that the final yield will be decreased if a part of the organic acid is used up in this undesirable side reaction. Of equal economic importance is the loss of vinyl acetate which takes place when ethylidene diesters are formed. Loss of vinyl acetate by formation of ethylidene diesters has proved to be so high at the refluxing temperatures customarily used for this reaction that the vinyl interchange process has been considered to be completely uneconomic for use on an industrial scale. Even at the lower temperatures, 20–30° C., more recently used in the vinyl interchange reaction, the loss of vinyl acetate due to formation of ethylidene diesters may be too high to make the process commercially practicable.

Ethylidene diesters are particularly likely to be formed during the distillation of vinyl acetate and acetic acid from the reaction mixture, with consequent loss of vinyl acetate. The ethylidene diesters may decompose during the final distillation of the product, furthermore, forming acetaldehyde and acetic anhydride. The mercury salts present in the reaction mixture are then reduced by the acetaldehyde to metallic mercury, which frequently distills over and is found in the purified product. Acetaldehyde in the distillation system also causes "bumping," frothing and other process difficulties.

One of the objects of our invention is to increase the degree of conversion of carboxylic acids to vinyl esters in the vinyl interchange reaction. Another object is to decrease losses of vinyl ester by decomposition or polymerization during the recovery of the ester from the vinyl interchange reaction mixture. A still further and very important object is to reduce or eliminate losses of vinyl acetate due to side reactions which take place during the formation or purification of the vinyl esters. Finally, it has been our object to develop a commercially dependable and economically practical process for the production of vinyl esters based on the vinyl interchange reaction.

We have invented a process for the preparation of vinyl esters, based on the vinyl interchange reaction, by which we are able to obtain high yields of vinyl ester with a minimum of loss of the vinyl ester by decomposition or polymerization and little or no loss of vinyl acetate through side reactions. In addition, by using our new process, we have been able to synthesize a number of previously undescribed vinyl esters.

Our invention will be most readily understood by reference to the following example which describes the preparation of vinyl stearate.

*Example 1*

To 6244 g. (about 72 moles) of vinyl acetate there were added 0.6 g. copper resinate (polymerization inhibitor) and 6.5 g. mercuric acetate, and the mixture was cooled to 0° C. An amount of concentrated sulfuric acid (3.3 g.), approximately equivalent to the mercuric acetate was slowly stirred into the mixture, followed by the addition of 1626 g. (6 moles) of a commercial stearic acid. The mixture was heated quickly to 50° C. to dissolve the stearic acid, immediately cooled to about 30° C., and allowed to stand for 96 hours. When a sample was analyzed for vinyl stearate and stearic acid, 94% of the stearic acid was found to have been converted to vinyl stearate. The sulfuric acid was then neutralized with 10 g. of sodium acetate trihydrate dissolved in 8 ml. of water.

Unreacted vinyl acetate was removed by continuous flash distillation at atmospheric pressure and a temperature of 100° C., after which the acetic acid formed in the course of the reaction was distilled off at 120° C. and a pressure of 12 mm. of mercury. An amount of 5701 g. of vinyl acetate was recovered, less than 1% of the total amount of vinyl acetate having been lost.

The mixture of vinyl stearate and stearic acid which remained weighed 1791 g., of which 94% or 1686 g. was vinyl stearate. This mixture was washed with about 1800 g. of a 20% solution of sodium bromide acidified by the addition of hydrochloric acid to pH=1, until analysis showed that all the mercury had been removed. Further washing with water was carried out until the hydrochloric acid had been completely eliminated. The sodium bromide solution could be re-used several times, after which the mercury could be recovered by treating the solution with sodium or hydrogen sulfide.

The crude mixture of vinyl stearate and stearic acid was heated to a temperature of 40° C. until the mixture was entirely liquid. Concentrated sodium hydroxide solution (15 g. dissolved in 20 ml. water) was slowly stirred into the liquid mixture. The resulting precipitate, sodium stearate, was removed by filtering through a Buchner funnel and the filter cake was pressed as dry as possible. The filter cake was washed with 500 g. of vinyl acetate at 60° C. in order to remove occluded vinyl stearate and the washings were added to the main portion of the filtrate. Stearic acid could be recovered from the sodium stearate precipitate. Of the 1686 g. of vinyl stearate present in the crude mixture of vinyl stearate and stearic acid, 1236 g. was recovered by filtration. An additional 358 g. of vinyl stearate was recovered from the soap by washing with vinyl acetate, making a total of 1594 g. of vinyl stearate separated from its mixture with stearic acid.

Vinyl stearate was recovered from the filtrate of the preceding step by continuous flash distillation at pressures from 0.5 to 1 mm. of mercury and a temperature of about 210° C., care being taken to keep the residence time of the vinyl stearate in the still as low as possible. The final yield of vinyl stearate was 1578 g., which is 89% of the theoretical yield. The loss of vinyl stearate during the distillation step was about 1%.

It will be noted that in the above example, 12 moles of vinyl acetate have been used with one mole of stearic acid, instead of the 6:1 ratio customarily used in the past. We have found that by using this larger ratio of vinyl acetate to organic acid, very much higher conversions of the acid to the corresponding vinyl ester are obtained. For example, the prior art shows 62% conversion of stearic acid to vinyl stearate when the 6:1 ratio of vinyl acetate to stearic acid was employed, while we have been able to obtain conversions ranging between 90 and 97%.

The use of the higher ratio of vinyl acetate to stearic acid has another advantage in that it eliminates the necessity for the initial period of heating at 75° C. which is necessary to obtain good solution of the stearic acid in a smaller amount of vinyl acetate. We have found that with the 12:1 mole ratio of vinyl acetate to stearic acid, we obtain good solution of the stearic acid by heating to only 50° C., and that when such a solution is cooled again to room temperature, no stearic acid crystallizes from solution. When a 6:1 mole ratio is used, on the other hand, the stearic acid dissolves at 50° C. but almost immediately begins to crystallize out as soon as the heat is removed. We have found that by eliminating the necessity for raising the temperature of the reaction mix above about 50° C., and specifically by eliminating the initial period of 15 minutes at 75° C. which has sometimes been used in the past, we are able to make a substantial reduction in the formation of ethylidene diesters by side reactions during the vinyl interchange process. The 12:1 mole ratio described in Example I gives outstanding results for most organic acids, and little or no improvement in conversion is gained by further increase in the amount of vinyl acetate.

The use of large excesses of vinyl acetate in the reaction mixture, however, presents another severe problem, the solution of which forms an important part of our invention. The presence of an excess of vinyl acetate tends to increase the formation of ethylidene diacetate by the side reactions described above, which leads to heavy losses of vinyl acetate and greatly increases the expense of carrying out the process.

We have now discovered that undesirable side reactions may be reduced to a minimum and the vinyl interchange reaction still allowed to proceed normally by drastically reducing the proportion of catalyst used in the interchange reaction. Instead of 2% of catalyst based on the weight of the stearic acid, which is the usual amount of catalyst used in the prior art, it will be noted that Example I shows the use of 0.4% of catalyst based on the weight of the stearic acid. With this amount of catalyst, and using the larger excess of vinyl acetate described above, we have achieved conversions of 90% and above and have avoided appreciable loss of vinyl acetate during the course of the reaction or during purification of the vinyl ester product. We believe, therefore, that the vinyl interchange reaction must be capable of being catalyzed by very small amounts of mercuric salts whereas the side reactions leading to loss of vinyl acetate must require a larger amount of catalyst.

Based on the above considerations, we believe that the proportion between the catalyst and the vinyl acetate used in the reaction mixture is a most important relationship and must be very carefully controlled in order to avoid losses of vinyl acetate due to side reactions. We therefore prefer to express the amount of catalyst used in our improved process as percent of the weight of vinyl acetate, rather than of the weight of the organic acid as has been customary in the past. It will be seen by reference to Example I that 6.5 g. of mercuric acetate was used in the conversion of stearic acid to vinyl stearate. This amount of mercuric acetate is 0.4% of the weight of the stearic acid, and 0.1% of the weight of the vinyl acetate used in Example I. It has been our experience that good conversions of stearic acid to vinyl stearate may be obtained with considerably larger amounts of mercuric acetate, even 3 or 4 times the amount of catalyst having given over 90% conversion, but that these larger amounts of catalyst tend to promote the undesirable side reactions. We have found, therefore, that the amount of catalyst must be limited to not more than about 0.2% by weight of the vinyl acetate used, in order to minimize side reactions. The proportion shown in Example I, i.e. 0.1% by weight of the vinyl acetate seems to give the optimum combination of good conversion of the acid and reduction of side reactions. When the catalyst concentration drops below 0.05% of the weight of the vinyl acetate, the percent conversion of acid begins to fall off, making these lower concentrations of catalyst less important from a practical point of view.

A further advantage accrues from the reduction of the amount of catalyst used in the vinyl interchange reaction. Where it has been necessary in the past to hold the reaction mixture at a temperature of 30° C. or below after the initial heating period in order to suppress as much as possible the occurrence of undesirable side reactions, we have found that with the lower proportions of catalyst which we use according to our invention, the reaction mixture may be heated to 50° C. throughout the course of the reaction without appreciable loss of vinyl acetate in side reactions. This procedure has the advantage that at 50° C. the reaction will proceed to the desired equilibrium in about 30 hours instead of the 96 hours needed when the lower temperature is used.

The increase in percent conversion of organic acid to vinyl ester which we have achieved represents an important step in the direction of developing a commercial process for the production of vinyl esters, because it assures a high yield of esters without loss of vinyl acetate. The importance of a high percent conversion of acid from the practical standpoint of greater ease of handling materials will be discussed in a later portion of this specification.

The conditions of distillation under which vinyl acetate and acetic acid are removed from the reaction mixture also have an important effect on the efficiency of our process. We have found that overheating at this stage of the process causes some decomposition of the vinyl ester product as well as ethylidene diester formation and polymerization of the vinyl ester. For example, it has been our experience that increasing the pot temperature during batch-type distillation from 110° C. to 145° C. causes a 10% decrease in vinyl ester content and a corresponding 10% increase in unreacted acid content of the reaction mixture. In addition, at the higher temperature, we have found that there is substantial formation of ethylidene diesters and polymerization of the vinyl ester. We have, therefore, found it necessary to keep the temperature of the reaction mixture to as low a level as possible during distillation of vinyl acetate and acetic acid; we prefer to use temperatures not over 120° C. Of equal importance, we have discovered, is the use of a continuous flash distillation method with as low a residence time as possible. This we have achieved by the use of a continuous vacuum still. Overheating has been avoided by continuously dripping in the reaction mixture and by providing a large surface for evaporation. Excess vinyl acetate has been removed from a reaction mixture containing 95% vinyl stearate and 5% unreacted acid at 130° C. by the above method without change in the vinyl stearate content of the mixture. However, even at the low temperature of 110° C., a batch distillation with a residence time of 1 hour resulted in a drop of 5% in vinyl stearate content and a corresponding 5% increase in concentration of stearic acid.

Removal of the mercury salt which has been used as a catalyst in the vinyl interchange reaction is an important step in our new process. Without the catalyst present, final distillation of the vinyl ester product may be carried out much more successfully and without the decomposition of vinyl ester previously encountered. The most effective method which we have found for removing the catalyst is that described in the above example. In some cases, up to 3,000 p.p.m. or more of mercury salts may be present in the crude mixture of vinyl ester and unreacted acid after the completion of the vinyl interchange reaction. Washing with an acidified sodium bromide solution as described above reduces the concentration of mercury salts to less than 1 p.p.m. We believe that the effectiveness of this wash is due to the formation of a water soluble mercury bromide complex, $Na_2HgBr_4$.

The sodium bromide solution may be used repeatedly without losing its effectiveness and the mercury may be recovered completely from the sodium bromide washes by precipitation with hydrogen or sodium sulfide.

Another method which may be used to remove mercury salts from the reaction products is repeated washing with water at a temperature of 80° to 90° C. This method, however, is more tedious and does not remove all the mercury present, a residue of about 20 p.p.m. being present even after several washings have been made. For this reason we ordinarily prefer to use the sodium bromide wash. Alternatively, under certain conditions it may be desirable to make the initial washings with hot water followed by a final wash with a sodium bromide solution to remove the small residue of mercury salts not removed by the water wash.

Some hydrolysis of the vinyl ester takes place if the washing with either water or sodium bromide solution is carried out in the presence of acetic acid. The washing step is, therefore, performed following the removal of acetic acid from the reaction mixture.

Our preferred method of separation of unreacted acid from its vinyl ester is shown in the above example. The amount of sodium hydroxide which is added to the crude mixture of stearic acid and vinyl stearate is at least the chemical equivalent of the stearic acid present and preferably about 2% in excess of this amount. It was found that the sodium stearate soap which was formed carried with it about 30% of its own weight of vinyl stearate, even after the filter cake had been pressed as dry as possible. Substantially all of this occluded vinyl stearate was recovered by washing the filter cake with a warm solvent as described in the example.

The separation of unreacted acid from the vinyl ester depends to some extent for its success on a high degree of conversion of the acid to vinyl ester during the vinyl interchange reaction. The separation of a soap such as sodium stearate from a liquid vinyl ester is a practical possibility when the soap forms only a small proportion of the total mixture. When, however, conversion of acid to vinyl ester has been low, for example only about 60%, and the amount of unreacted acid is high, we have found that the soap cannot be removed successfully from the vinyl ester by filtration.

Due to the tendency of vinyl esters to become hydrolyzed, particularly if heated, the success of the above-described methods for removing mercury salts and unreacted organic acid would not normally be expected. We have found, however, that once the acetic acid has been removed from the reaction mix, water may be added to the mixture of vinyl ester and unreacted acid even at somewhat elevated temperatures, i.e. 40° to 50° C., without any substantial danger of hydrolysis.

The caustic refinement step described in Example I may be used successfully for the separation of unreacted stearic acid or other higher fatty acids from their vinyl esters. Certain modifications of the method have to be made however, in the case of acids the sodium salts of which are normally liquid at room temperature, as for example the monoalkyl esters of dibasic acids such as phthalic and maleic acid. In such cases following the formation of the sodium salt, the vinyl ester is removed from the mixture by extraction with a solvent, for example ether or chloroform. The solvent is readily removed during the final distillation of the vinyl ester. In some instances, we have found it expedient to use other alkaline materials instead of the concentrated aqueous solution of sodium hydroxide described above. Potassium hydroxide may be used, for example, or a solution of sodium hydroxide in methanol may be substituted for the concentrated aqueous solution. In a still further variation of the so-called caustic refinement step, calcium hydroxide may be added to the mixture of unreacted acid and its vinyl ester, and the vinyl ester removed by distillation over the calcium hydroxide.

As we have pointed out above, batch distillation of high boiling vinyl esters cannot be carried out without considerable loss of ester by polymerization, up to 20% of the vinyl ester sometimes being lost in this manner. Accordingly, an important step in our improved process is the use of continuous vacuum distillation with as low a residence time as possible. This is accomplished in the same manner as the distillation of vinyl acetate and acetic acid described above. By using this method of distillation we are able to reduce the polymerization of vinyl esters to about 1%.

The following examples show the application of our improved process to the preparation of a variety of vinyl esters.

Example II

The procedure of Example I was followed except that the mixture was held at a temperature of 50° C. for about 30 hours. It was found that 93.5% of the stearic acid was converted to vinyl stearate. No formation of ethylidene diesters was observed, and the excess of vinyl acetate was recovered as reported in Example I.

Example III

Vinyl pelargonate was prepared according to the procedure of Example I by reacting 3100 g. (about 36 moles) of vinyl acetate containing 3 g. mercuric acetate, 0.4 g. copper resinate and 1.8 g. concentrated sulfuric acid with 474 g. (3 moles) pelargonic acid. After the reaction had proceeded to a conversion of 94% of the acid, the reaction mixture was neutralized by the addition of 4 g. sodium acetate in 4 ml. water. Following the removal of the acetic acid and excess vinyl acetate, the catalyst was extracted by washing with 600 g. of a 20% solution of sodium bromide acidified to pH=1. Unreacted acid was removed by reaction with 8 g. sodium hydroxide dissolved in 8 ml. water. The only difference between the procedure in this example and that of Example I was that, pelargonic acid being a liquid at room temperature, the separation of unreacted acid could be carried out at room temperature.

A final yield of 495 g. or 90% of the theoretical was obtained.

Example IV

Vinyl laurate was prepared following the procedure of Example I with the exception that the reaction was allowed to proceed for 5 days at 30° C. and that the separation of unreacted acid was carried out at room temperature. In this example 2064 g. vinyl acetate (24 moles), 2.2 g. mercuric acetate, 0.2 g. copper resinate, 0.6 ml. fuming sulfuric acid, and 400 g. (2 moles) lauric acid were used. After reaction, the mixture was neutralized with 5 g. sodium acetate trihydrate, acetic acid and vinyl acetate were removed, and 500 g. of the sodium bromide solution as used in the previous examples was used to remove the catalyst. Unreacted acid was separated from the vinyl laurate by the addition of 9 g. sodium hydroxide dissolved in 10 ml. water.

A conversion of 94% and a yield of 90% of the theoretical (424 g.) were obtained.

Example V

A 200 g. portion of mono-n-butyl maleate was added to a mixture of 2064 g. vinyl acetate, 2 g. mercuric acetate, 0.2 g. copper resinate and 1.2 g. concentrated sulfuric acid. Reaction was allowed to proceed for 6 days at 45° C., after which the mixture was neutralized with 5 g. sodium acetate dissolved in 10 ml. water. The general procedure of Example I was followed. In the caustic refinement step, the crude n-butyl vinyl maleate was washed several times with a 0.1 N sodium hydroxide solution until the wash remained alkaline. The ester was extracted with chloroform and then flash distilled. A conversion of 90% and a yield of 170 g. of n-butyl vinyl maleate or 76% of the theoretical were obtained.

Example VI

A 200 g. portion of mono-n-butyl phthalate was added to a mixture of 2064 g. vinyl acetate, 2 g. mercuric acetate, 0.2 g. copper resinate, and 1.2 g. concentrated sulfuric acid. Reaction was allowed to proceed for 5 days at 30° C., after which the general procedure of Example I was followed. Instead of the usual caustic refinement step, the crude ester was flash distilled over 30 g. of calcium hydroxide. A conversion of 90% and a yield of 200 g. of n-butyl vinyl phthalate or 88% of the theoretical were obtained.

The process as described above is also applicable to polybasic acids, as for example dibasic acids such as oxalic acid. The formation of a divinyl ester of oxalic acid is of particular interest, since divinyl oxalate decomposes at such low temperatures that it has been difficult if not impossible to prepare it by any of the methods known in the prior art.

It will be evident from the example which follows that in the case of dibasic acids, the ratio of vinyl acetate to the carboxylic acid must be increased. Since there are two reactive (carboxyl) groups in the acid molecule, one mole of the dibasic acid is treated as though it were 2 moles of a monobasic acid of the same molecular weight. In other words, each mole of an acid is considered as containing one reactive molar equivalent for every carboxylic group present in the acid. One mole of dibasic acid would therefore be considered as containing two reactive molar equivalents; one mole of a tribasic acid would contain three reactive molar equivalents, etc. According to our invention, vinyl acetate is reacted with the desired carboxylic acid in the proportion of about 12 moles of vinyl acetate to every reactive molar equivalent of carboxylic acid.

Example VII

A 180 g. portion of anhydrous oxalic acid was added to a mixture of 4100 g. vinyl acetate, 0.5 g. copper resinate, 4 g. mercuric acetate and 1.2 ml. of concentrated sulfuric acid. Reaction was allowed to proceed for 10 days at 30° C., after which the sulfuric acid was neutralized by the addition of sodium acetate. Due to the instability of the divinyl oxalate, the unreacted vinyl acetate was removed at very low pressure and a temperature of between 30° and 40° C. The acetic acid formed by the reaction was removed from the reaction mixture by washing with cold water, and the reaction mixture was thereafter dried by treating it with magnesium sulfate. Unreacted oxalic acid was removed by washing the reaction mixture with a solution of sodium bicarbonate and the divinyl oxalate was purified by flash distillation.

A large number of other vinyl esters has been prepared by our new process, including the vinyl esters of tall oil, hydrogenated rosin acid, disproportionated rosin acid, oleic acid, and the mono-n-octyl ester of phthalic acid.

In addition, by using our improved process we have been able to prepare several new and useful vinyl esters. The following examples describe the preparation of these new esters.

Example VIII

A 343 g. portion of mono-lauryl phthalate was added to a mixture of 1032 g. vinyl acetate, 1 g. mercuric acetate, 0.2 g. copper resinate, and 0.6 g. concentrated sulfuric acid. Reaction was allowed to proceed for 6 days at 25–30° C., after which the general procedure of Example I was followed. In the caustic refinement step, 9 g. sodium hydroxide dissolved in 100 ml. of methanol was added to the crude product and the vinyl ester was extracted with chloroform. Conversion was 74% and a yield of 229 g. of vinyl lauryl phthalate or 62% of the theoretical was obtained.

Example IX

A 556 g. portion of mono-2-ethyl hexyl phthalate was added to a mixture of 2064 g. vinyl acetate, 0.2 g. copper resinate, 2 g. mercuric acetate and 0.6 g. concentrated sulfuric acid. Reaction was allowed to proceed for 5 days at 30° C., after which the general procedure of Example I up to the caustic refinement step was followed. A conversion of 73% was obtained. Instead of the usual caustic refinement step, the crude ester was distilled over an amount of calcium hydroxide which was equivalent to the amount of mono-2-ethyl hexyl phthalate left in the mixture, and pure vinyl 2-ethyl hexyl phthalate was obtained.

Example X

A 178 g. portion of p-tertiary butyl benzoic acid was added to a mixture of 1064 g. vinyl acetate, 0.2 g. copper resinate, 1.2 g. mercuric acetate and 0.3 ml. of concentrated sulfuric acid. A 96% conversion resulted after reaction had been allowed to proceed for 4 days at 30° C. The general procedure of Example I was followed up to the caustic refinement step. Since the sodium salt of p-tertiary butyl benzoic acid is a liquid at room temperature, the alternative method of solvent extraction of the vinyl ester was followed, using ether as the solvent for the vinyl ester. The ether was removed from the vinyl ester in the final flash distillation step, and pure vinyl p-tertiary butyl benzoate was recovered.

Example XI

A 320 g. portion of behenic acid was added to a mixture of 1064 g. vinyl acetate, 0.2 g. copper resinate, 1.2 g. mercuric acetate and 0.3 ml. of concentrated sulfuric acid. The mixture was heated to about 60° C. for ten minutes, cooled to room temperature and held at room temperature for about 5 days. 85% of the behenic acid was converted to vinyl behenate. The general procedure of Example I was followed up to the caustic refinement step. Because the behenic acid has such a high melting point, 82° C., it was found expedient to modify the usual procedure somewhat. A slurry of the mixture of behenic acid and vinyl behenate was formed by adding acetone, and a concentrated aqueous solution of sodium hydroxide was added to the slurry. The sodium soap of behenic acid was precipitated from the slurry and was removed by filtration. The acetone was removed from the filtrate by distillation, and pure vinyl behenate was recovered.

The new vinyl esters described in Examples VIII through XI have been found to form useful polymers and copolymers. For example, when 2-ethyl hexyl vinyl phthalate was mixed with a small amount of di-tertiary butyl peroxide and heated to 185° C. for about 5 to 10 minutes, a viscous fluid formed which was found to be useful as a plasticizer in vinyl chloride compositions. Useful polymers, ranging from viscous fluids to solids, were also obtained with the other new esters described.

Although vinyl acetate is the most desirable starting material for the vinyl interchange reaction because of its availability and cheapness, vinyl formate and vinyl propionate may also be reacted with the carboxylic acid the ester of which is desired, and under the same general conditions which have been described above for vinyl acetate.

We claim:

1. The process for making vinyl esters which comprises reacting vinyl acetate with a carboxylic acid in the presence of catalytic amounts of mercuric sulfate, the molar proportion of the vinyl acetate to the acid groups of the carboxylic acid being about 12 to 1, and the catalyst being formed in the reaction mixture by the addition thereto of between 0.05% and 0.2% of mercuric acetate based on the weight of the vinyl acetate and an amount of concentrated sulfuric acid which is about the chemical equivalent of the mercuric acetate used, the mixture being heated initially to a temperature of about 50° C., cooled to 30° C. and thereafter maintained at a temperature of about 30° C. throughout the course of the reaction.

2. The process of separating the vinyl ester of a fatty acid from a mixture consisting essentially of the said vinyl ester and the said fatty acid which includes the steps of heating the mixture to a temperature at which both the vinyl ester and the fatty acid are liquid, adding to the mixture a concentrated aqueous solution of sodium hydroxide in an amount which is at least chemically equivalent to and does not exceed by more than about 2%, the amount of fatty acid present in the mixture, and separating the solid sodium salt of the fatty acid so formed from the vinyl ester by filtration.

3. The process of making a vinyl ester which includes the steps of reacting vinyl acetate with a carboxylic acid, the molar proportion of the vinyl acetate to the acid groups of the carboxylic acid being about 12 to 1, the reaction being carried out in the presence of a catalyst formed in the reaction mixture by adding thereto mercuric acetate in an amount of between 0.05% and 0.2% by weight based on the weight of the vinyl acetate and about an equivalent amount of sulfuric acid, allowing the reaction to proceed until about 90% of the carboxylic acid has been converted to its vinyl ester, removing the unreacted vinyl acetate and the acetic acid formed during the reaction by continuous flash distillation, washing the remaining portion of the reaction mixture with an acidified aqueous solution of sodium bromide, at a pH such that a water-soluble mercury-sodium bromide complex salt is formed, until the mercury salt has been removed, treating the said remaining portion of the reaction mixture with an alkaline material in order to form a salt of the said carboxylic acid, and flash distilling the said remaining portion of the reaction mixture to recover pure vinyl ester therefrom.

4. The process of making a vinyl ester of a fatty acid which includes the steps of reacting an amount of about 12 moles of vinyl acetate with one mole of a fatty acid in the presence of a catalyst formed in the reaction mixture by adding thereto mercuric acetate in an amount of between 0.05% and 0.2% by weight based on the weight of the vinyl acetate and about an equivalent amount of sulfuric acid, allowing the reaction to proceed until about 90% of the fatty acid has been converted to the vinyl ester of the fatty acid, removing the unreacted vinyl acetate and the acetic acid formed during the reaction by continuous flash distillation, washing the remaining portion of the reaction mixture with an acidified aqueous solution of sodium bromide, at a pH such that a water-soluble mercury-sodium bromide complex salt is formed, until the mercury salt has been removed, heating the said remaining portion of the reaction mixture to a temperature at which all the constituents thereof are liquid, adding thereto a concentrated aqueous solution of sodium hydroxide in an amount which is at least equivalent to and not more than about 2% in excess of the amount of fatty acid present in the mixture, filtering the mixture to remove the precipitated sodium salt of the fatty acid therefrom, and flash distilling the filtrate to recover the pure vinyl ester.

5. The process of claim 4 in which the temperature of the reaction mixture is at no time during the reaction allowed to exceed about 50° C.

6. The process of claim 4 in which the reaction mixture is heated to 50° C. to dissolve the fatty acid, cooled to 30° C. and reacted at 30° C. for about 96 hours.

7. The process of claim 4 in which the reaction takes place at a temperature of about 40° to 50° C. and is allowed to proceed for about 30 hours.

8. The process of making vinyl stearate which includes the steps of reacting an amount of about 12 moles of vinyl acetate with one mole of stearic acid in the presence of a catalyst formed in the reaction mixture by adding thereto mercuric acetate in an amount of about 0.1% by weight based on the weight of the vinyl acetate and about an equivalent amount of sulfuric acid, heating the reaction mixture to about 50° C. until the mixture is liquid, cooling the reaction mixture to about 30° C. maintaining the temperature of the reaction mixture at about 30° C. for a period of about 96 hours, adding to the reaction mixture an amount of sodium acetate which is approximately chemically equivalent to the sulfuric acid in order to neutralize the sulfuric acid and thereby interrupt the reaction between the vinyl acetate and the stearic acid, removing the unreacted vinyl acetate and the acetic acid formed during the reaction by continuous flash distillation, washing the remaining portion of the reaction mixture consisting of a mixture of vinyl stearate and unconverted stearic acid with an aqueous solution of sodium bromide which has been acidified by addition of hydrochloric acid to about pH=1, until the mercury catalyst has been removed, washing the said mixture of vinyl stearate and stearic acid with water in order to remove the hydrochloric acid left in the mixture from the sodium bromide treatment, warming the mixture of vinyl stearate and stearic acid to about 40° C., adding thereto an amount of 50% aqueous solution of sodium hydroxide which is about 2% in excess of the amount which is chemically equivalent to the unreacted stearic acid present, filtering out the sodium stearate so formed while maintaining the mixture at 40° C., pressing the filter cake as dry as possible, washing the filter cake with vinyl acetate at a temperature of 50° to 60° C. to remove vinyl stearate occluded in the filter cake, adding the washings to the filtrate and thereafter flash distilling the filtrate to recover pure vinyl stearate.

9. The process for making vinyl esters by reacting vinyl acetate with a carboxylic acid in the presence of catalytic amounts of a mercury salt of a strong acid and thereafter recovering the vinyl ester by distillation, which includes the step of removing the mercury salt from the reaction mixture prior to the distillation of the vinyl ester by treating the said reaction mixture with an acidified aqueous solution of sodium bromide, at a pH such that a water-soluble mercury-sodium bromide complex salt is formed.

References Cited in the file of this patent

UNITED STATES PATENTS

| | | |
|---|---|---|
| 2,066,075 | Reppe | Dec. 29, 1936 |
| 2,299,862 | Toussaint et al. | Oct. 27, 1942 |
| 2,578,950 | Scheibli et al. | Dec. 18, 1951 |
| 2,586,860 | Port et al. | Feb. 26, 1952 |
| 2,644,009 | Cash et al. | June 30, 1953 |
| 2,756,219 | Fredericus van der Plas et al. | July 24, 1956 |

FOREIGN PATENTS

| | | |
|---|---|---|
| 686,050 | Great Britain | Jan. 14, 1953 |